US012636997B2

(12) United States Patent (10) Patent No.: US 12,636,997 B2
Massey et al. (45) Date of Patent: May 26, 2026

(54) RECONFIGURABLE LIGHT THAT PROVIDES MULTIPLE DIFFERENT LIGHT CONFIGURATIONS FROM A SINGLE HOUSING AND CONTROLLING THE RECONFIGURABLE LIGHT

(71) Applicant: Valeo Vision, Bobigny (FR)

(72) Inventors: Andrew Massey, Seymour, IN (US); Mark Verplank, Seymour, IN (US)

(73) Assignee: Valeo Vision, Bobigny (FR)

( * ) Notice: Subject to any disclaimer, the term of this patent is extended or adjusted under 35 U.S.C. 154(b) by 344 days.

(21) Appl. No.: 18/466,401

(22) Filed: Sep. 13, 2023

(65) Prior Publication Data

US 2025/0083590 A1     Mar. 13, 2025

(51) Int. Cl.
B60Q 1/14 (2006.01)
H05B 47/11 (2020.01)
H05B 47/155 (2020.01)

(52) U.S. Cl.
CPC ............. B60Q 1/143 (2013.01); H05B 47/11 (2020.01); H05B 47/155 (2020.01)

(58) Field of Classification Search
CPC ........ B60Q 1/143; B60Q 1/2603; B60Q 1/28; H05B 47/11; H05B 47/155
See application file for complete search history.

(56) References Cited

U.S. PATENT DOCUMENTS 9,261,253 B2     2/2016  Mochizuki et al.
9,527,431 B2 *   12/2016  Fritz ........................ B60Q 1/12

9,726,809 B2     8/2017  Sato
9,939,125 B2     4/2018  Donato et al.
10,436,403 B2   10/2019  Warner et al.
10,488,007 B2   11/2019  Mayer et al.
10,542,632 B2    1/2020  Kim et al.
10,641,458 B2    5/2020  Xiang et al.
10,730,430 B2    8/2020  Williams et al.
10,920,950 B1    2/2021  Glickman et al.
11,320,111 B2 *  5/2022  Muegge ............... F21S 41/332
11,499,689 B1   11/2022  Munoz Ledo Espinosa et al.
11,745,642 B2 *  9/2023  Shimada ............... H05B 47/17
                                                                 315/79
2006/0203486 A1    9/2006  Lee et al.
(Continued)

FOREIGN PATENT DOCUMENTS

EP          2161494 B2     4/2020

*Primary Examiner* — Alexander H Taningco
*Assistant Examiner* — Pedro C Fernandez
(74) *Attorney, Agent, or Firm* — Young Basile Hanlon & MacFarlane, P.C.

(57) ABSTRACT

A light including: a first segment including: first lights with first states and first lights with second states; a second segment including: second lights with first states and second lights with second states; a third segment including: third lights with first states and third lights with second states; and wherein the light is in communication with a controller that is configured to: activate the first lights with the one or more first states to create a first light condition; activate the first lights with the one or more second states to create a portion of a second light condition; activate the second lights with the first states to complete the second light condition; and deactivate the first lights with the first states automatically when the first lights with the second states, the second lights the first states, or both are activated.

20 Claims, 10 Drawing Sheets

(56)         References Cited

U.S. PATENT DOCUMENTS

2007/0025117 A1*   2/2007   Watanabe  ............... F21S 41/47
                                                              362/543
2014/0160779 A1     6/2014   Pusch et al.
2015/0043236 A1*   2/2015   Yamamoto  ............. F21S 41/19
                                                              362/516
2016/0252226 A1     9/2016   Shih et al.
2016/0368414 A1*   12/2016   Son  ....................... F21S 41/663
2020/0300436 A1     9/2020   Paroni et al.
2021/0253020 A1*   8/2021   Santaella  ............. B60Q 1/1423

* cited by examiner

RECONFIGURABLE LIGHT THAT PROVIDES MULTIPLE DIFFERENT LIGHT CONFIGURATIONS FROM A SINGLE HOUSING AND CONTROLLING THE RECONFIGURABLE LIGHT

FIELD

The present teachings relate to a lighting device that provides three or more different lighting arrangements from a single housing.

BACKGROUND

Vehicles include many different types of lighting devices. Some types of lights included on a vehicle are low beam headlights, high beam headlights, taillights, turn signal lights, fog lights, daytime running lights, turn indicators (e.g., turn signal), parking lights, side markers, or a combination thereof. Each of these lighting devices emit light from an outer surface of a vehicle so that they provide light for the driver or provide notice to surrounding drivers. Typically, these lights are separately and distinctly located on the vehicle to provide a desired distinct function. However, providing multiple distinct lighting devices increases the packaging space and complexity.

Thus, there is a need for lighting devices that are located in a minimally-sized single device housing package where the emitted light can be altered to provide different lighting functions. There is a need for a system where a single lighting device can satisfy multiple functions based on whether the ambient conditions are a bright light state (e.g., for daytime lighting) or a dark light state (e.g., in low-light conditions). There is also a need for a lighting system that turns off one lighting function so that an area may be lit to provide a different lighting function. It would be desirable to have a lighting device that occupies minimal packaging space and provides multiple different light emissions and/or lighting functions by using one or more areas or regions for achieving multiple different functions. There is a need for a single device housing with a small packaging space that provides in excess of three, four, or more lighting functions.

SUMMARY

The present teachings provide: a light including: a first segment including: first lights with one or more first states and first lights with one or more second states; a second segment including: second lights with one or more first states and second lights with one or more second states; a third segment including: third lights with one or more first states and third lights with one or more second states; and wherein the light is in communication with a controller that is configured to: activate the first lights with the one or more first states to create a first light condition; activate the first lights with the one or more second states to create a portion of a second light condition; activate the second lights with the one or more first states to complete the second light condition; and deactivate the first lights with the one or more first states automatically when the first lights with the one or more second states, the second lights the one or more first states, or both are activated.

The present teachings provide a light including: a first segment including: first lights with one or more first states and first lights with one or more second states; a second segment including: second lights with one or more first states and second lights with one or more second states; a third segment including: third lights with one or more first states and third lights with one or more second states; one or more vehicle sensors configured to monitor a vehicle function of the vehicle or a mode of the vehicle; and wherein the light, the vehicle, and the one or more vehicle sensors, are in communication with a controller that is configured to: determine when the vehicle function changes to an on state; determine when the vehicle function is out of a park position; activate the first lights with the one or more first states to create a first light condition; activate the first lights with the one or more second states to create a portion of a second light condition; activate the second lights with the one or more first states to complete the second light condition; and deactivate the first lights with the one or more first states automatically when the first lights with the one or more second states, the second lights the one or more first states, or both are activated.

The present teachings provide A method including: controlling lights of a vehicle including: activating first lights with one or more first light states in a first segment to create a first light type; activating first lights with one or more second light states in the first segment to create a portion of a second light type; activating second light with one or more first light states in a second segment to complete the second light type; and deactivating the first lights with the one or more first light states when the first lights with the one or more second light states are activated; wherein the first lights with the one or more second light states in the first segment and the second light with the one or more first light states in the second segment combine to form a single light.

The present teachings provide a light comprising: a first segment comprising: first lights with one or more first states and first lights with one or more second states; a second segment comprising: second lights with one or more first states and second lights with one or more second states; a third segment comprising: third lights with one or more first states and third lights with one or more second states; one or more vehicle sensors configured to monitor a vehicle function of the vehicle or a mode of the vehicle; one or more light sensors configured to determine environmental lighting conditions surrounding a vehicle housing the light; and a controller in communication with the light, the vehicle, the one or more vehicle sensors, and the one or more light sensors, the controller being configured to: determine when the vehicle function changes to an on state; determine when the vehicle function is out of a park position; determine the environmental lighting conditions surrounding the vehicle; activate the first lights with the one or more first states to create a first light condition; activate the first lights with the one or more second states to create a portion of a second light condition, and deactivate the first light condition; and activate the second lights with the one or more first states to complete the second light condition.

The present teachings provide a light comprising: a housing that is connectable to or within a vehicle; reflectors located within the housing and being divided into three or more segments so that the light comprises: a first segment, a second segment, and a third segment; and a plurality of light sources located within each of the three or more segments, some or all of the plurality of light sources comprising: a first light state and a second light state; wherein the first segment, the second segment, and the third segment are illuminated by first lights with the first light state respectively to generate a first light type, in each of the first segment, the second segment, and the third segment and wherein the first segment, the second segment, and the third segment respectively include first lights with the second light state to generate a second light type that is different than the first light type in each of the first segment, the second segment, and the third segment.

The present teachings provide lighting devices that are located in a minimally-sized single device housing package where the emitted light can be altered to provide different lighting functions. The present teachings provide a system where a single lighting device can satisfy multiple functions based on whether the ambient conditions are a bright light state (e.g., for daytime lighting) or a dark light state (e.g., in low-light conditions). The present teachings provide a lighting system that turns off one lighting function so that an area may be lit to provide a different lighting function. The present teachings provide a lighting device that occupies minimal packaging space and provides multiple different light emissions and/or lighting functions by using one or more areas or regions for achieving multiple different functions. The present teachings provide a single device housing with a small packaging space that provides in excess of three, four, or more lighting functions.

DETAILED DESCRIPTION

Figure 1:
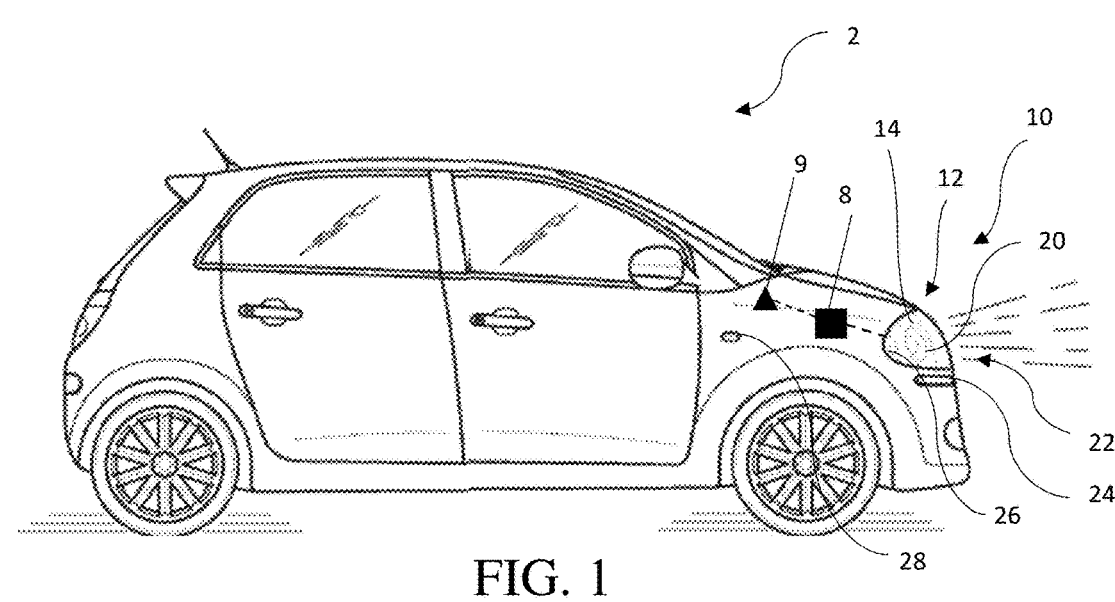
FIG. 1 is a side view of a vehicle including a light system with lighting devices.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a light system. The light system may be a self-contained system that is installed into a vehicle. The light system is located within a vehicle to provide lighting types (e.g., a lighting function such as turn indicator, high beam, low beam, parking indicator, daytime running light, fog light, side marker). Preferably, the light system is part of a vehicle such as a car, motorcycle, bus, truck, semi-truck, SUV, XUV, four-wheeler, dirt bike, tractor, combine, heavy equipment, farm equipment, industrial equipment, commercial equipment, or a combination thereof. The light system may project light in a forward direction, rear direction, side direction, vertical direction (e.g., z-axis), from a fore to an aft, an aft to a fore, or a combination thereof. The fore may be a forward direction of a vehicle or a front. The aft may be a rear direction of a vehicle. Preferably, the light system projects a light from an external surface of the vehicle to a location in front of the vehicle or at an angle relative to the front or rear of a vehicle. The light system may direct some light at the ground. The light system may direct some light above the ground. The light system may be integrated into a front end, a rear end, or both of a car. The light system may extend from a first surface to a second surface. The light system may extend from a front of the vehicle to a side of the vehicle. The light system may be an assembly. The light system may be a sealed light system that is integrated into a vehicle. The light system may be a sub-assembly that is included in a larger light system. The light system may be integrated into another light system and may function to be part of the light system. The light system may project light out of the vehicle. The light systems may be multiple light systems, light sources, lights, or a combination thereof stacked one above the other, side by side, within different planes, within a same plane and projecting in different direction, integrated into a single light system, or a combination thereof. The light system may have multiple smaller light systems or lights. The plurality of light systems or lights may be located in one light system. The plurality of light systems may operate independently of one another such that one light system may not affect another light system or portion of the light system. The light of the vehicle may be two or more, three or more, or four or more light systems located adjacent one another.

The light system may be or include one or more static lights, one or more movable lights, and one or more lights that include one or more light sources. The present teachings relate to a light system that may be incorporated into the vehicle or adjacent to another light system. The light system may include one or more lighting devices.

The lighting devices or light sources may be a single light or lamp that provides multiple different types of light, light functions, or both. The lighting devices may be incorporated into the light system. The lighting devices may provide one or more, two or more, three or more, four or more, or even five or more different types of lights (e.g., different lighting functions of the vehicle). The lighting devices may be all located in a single plane. The lighting devices may be located in two or more planes, three or more planes, or four or more planes. The light system may be divided into a plurality of segments and each of the segments may include one or more lighting devices or two or more lighting devices. The segments and lighting devices may all be coplanar. Some of the segments may be located on different planes. All of the segments may be located on different planes. Some segments may be coplanar, and some segments may be located in different planes. The lighting device may provide or be a turn indicator, parking indicator, daytime running light (DRL), high beam, low beam, side maker, fog light, or a combination thereof. The lighting devices may generate three or more light types, four or more light types, five or more light types, six or more light types, or seven or more light types. The lighting devices may be combined together to create one or more light type or two or more light types. For example, lighting devices of a first segment and lighting devices of a second segment may be combined together to form a single light type or a single light condition. The light types may be created from a single set of lighting devices (e.g., light sources) within the light system. The light types may be created by a plurality of sets of lighting devices so that each of the plurality of sets of lighting devices generate a different type of light. The lighting devices may have one or more segments. The lighting system may have a plurality of segments that each include one or more lighting devices.

The segments function to generate one or more types of light (e.g., lights that perform some task or provide some light indication). The light system may include two or more, three or more, four or more, or five or more segments. Each segment produces at least one light type (e.g., a light function). Each segment may produce two or more light types. Some or all of the segments may include a first light (e.g., set of light devices) and a second light (e.g., set of light devices). Some or all of the segments may be changed between a first light type and a second light type. For example, a first light type may be generated by illuminating a first set of light devices and a second light type may be generated by illuminating a second set of lighting devices. Some or all of the segments may change from light devices with a first state to light devices with a second state. The segments may be optically divided. For example, light from one segment may be prevented from passing into another segment.

The segments may provide some optical overlap. For example, some light devices in a first segment may provide light that overlaps with some light devices in a second segment to create a single light type. Some of the segments may provide light, from one or more light devices, into an area of another segment. For example, light from one segment may overlap light of a second segment so that the two segments are blended. The segments may be parallel to one another. The segments may be side by side. The segments may be coplanar. The segments may curve. The segments may curve so that some light projects in a first direction and some light projects in a second direction. For example, a segment may project light on a side of a car when the first light state is activated and in front of the car when the second light state is activated. The segments may have an angle. The light system may wrap so that the segments turn the light system from a first side of the car to a second side of the car. For example, a first segment may emit light in a forward direction of the vehicle and a subsequent segment may emit light in a side direction of the vehicle. The segments may be or include a first segment, a second segment, a third segment, a fourth segment, a fifth segment, or a combination thereof. Each segment may include one or more reflectors and one or more lighting devices (e.g., light sources). The first segment may include or provide a high beam, a turn indicator, daytime running light (DRL), or a combination thereof. The second segment may include or provide a parking indicator, a turn indicator, a DRL, or a combination thereof. The third segment may include or provide a low beam, a DRL, or both. The fourth segment may include or provide a side marker, a turn indicator, or both. The fifth segment may include or provide a fog light, a DRL, a low, beam, or a combination thereof. The segments all include a height and a length.

The height may be a direction extending away from a road surface (e.g., a vertical direction). The length may be in a direction from a passenger side towards a driver side (e.g., a horizontal direction). The heights of all of the segments may be substantially identical. The heights may taper from a first side to a second side. The height at the first segment may be larger than a height of the third segment. The lengths may vary from segment to segment. The first segment may have a greatest length. The second segment may have a shortest length. The first segment may be longer than the second segment and the third segment. The first segment and the second segment may combine along the length to form a light type (e.g., a turn signal). The fourth segment and the fifth segment may be shorter than the first segment, the second segment, and third segment. The fourth segment may be shorter than the fifth segment. Each segment may include a plurality of reflectors, a plurality of light sources, and a plurality of sets of light sources.

The light sources (e.g., lighting devices used interchangeably herein) function to produce light. The light sources may be a plurality of light sources. The light sources may be a plurality of light sources in each of the segments. For example, if there are three segments each segment may include two or more of the light sources. The light source may be a device or a plurality of devices that create light and the light extends outward from the light source and light system. The light sources may generate two different light states within a single section. The light states may provide a different lighting function, lighting intensity, light color, light size, illumination region, or a combination thereof. The light source may produce a high beam, a low beam, a blending beam, a running light, a daytime light, a turn signal, a brake light, turn indicator, fog light, side marker, or a combination thereof. The light sources may have different functions. For example, one light source may provide a running light and another light source may be a turn signal. Preferably, a first light source in a first segment and a second light source in a second segment combine together to provide a single light function (e.g., or light type). The light source may comprise a plurality of lights or may be a single light source within a set of light sources. The plurality of lights may be in one set or group of light sources. The light source may be a single light that projects light. In another example, a light source (e.g., first state) may direct light in a first direction and a second light source (e.g., second state) may direct light in a second direction that is different from the first direction. The first light from a first light source of a first segment and the second light from a second light source of a second segment may extend in different directions but may be visibly combined to provide a light function.

The light sources may include or emit third lights, fourth light, fifth lights, or a combination thereof in addition to the first lights and the second lights. The first direction may be along a z-axis within a coordinate system. The second direction may be along an x-axis within a coordinate system. The plurality of lights may be located in rows, columns, a matrix, or a combination thereof. The light sources may be two rows of light sources. Each segment may include light sources with a first state and a second state. Each of the light sources may include a first state and a second state. The first lights (e.g., first light sources) may include a first state and a second state. The second lights (e.g., second light sources) may include a first state and a second state. The third lights (e.g., third light sources) may include a first state and a second state. The fourth lights (e.g., fourth light sources) may include a first state and a second state. The fifth lights (e.g., fifth light sources) may include a first state and a second state.

The first state and the second state may direct or emit light to a same reflector or in a same direction (e.g., by direct lighting). The first state and the second state may generate a different color of light, generate a different intensity of light, have a different optical axes, be a different distance from the reflector, have different focal lengths, different focal points, different illumination regions, or a combination thereof. The first state and the second state may be paired so that the first state and the second state direct light to the same reflector. The first state and second state may be active simultaneously. For example, a first light state may be activated to create a DRL and then the second light state may be activated to increase light to become a low beam. The first state and second state may not be active at the same time. Thus, if the first state is active the second state may be deactivated or vice versa. The light system may be in communication with one or more controllers and the one or more controllers may monitor a state of a first light system and a second light system so that if a state of the first light system changes the state of the second light system is also changed. For example, if a left turn signal is turned on then the high beam of the first light system and the second light system are deactivated. The light sources emitting light with the first state and the light sources emitting light with the second state may be located along a common axis. The light sources emitting light with the first state and the light sources emitting light with the second state may be located on different axes. The light sources emitting light with the first state and the light sources emitting light with the second state may be located at a same height. The light sources emitting light with the first state and the light sources emitting light with the second state may be located at different heights. The light sources emitting light with the first state and the light sources emitting light with the second state may have different light intensities. The light sources emitting light with the first state may produce a first intensity and the light sources emitting light with the second state may produce a second intensity that is 10 percent or more, 20 percent or more, 30 percent or more, 40 percent or more, or 50 percent or more intensity than the first state (e.g., amount of light, lumens, candle power). The light sources emitting light with the second state may be 1.2 times, 1.5 times, 2 times, 3 times, or even 4 times that of the light sources emitting light with the first state. The light sources emitting light with the first state may be a white light, yellow light, orange light, red light, or a combination thereof. The light sources emitting light with the second state may be a white light, yellow light, orange light, red light, or a combination thereof. The light sources emitting light with the first state and the light sources emitting light with the second state may be different colors, different intensities, different focal regions, different directions, or a combination thereof. The first state and the second state may be created by one or more light sources.

The light sources may be any type of lighting device that produces light such as an incandescent bulb, fluorescent light, compact fluorescent lamp, halogen lamp, light emitting diode (LED), high intensity discharge lamps (HID); halogen lights, xenon lights, a laser diode, phosphorous bulb, or a combination thereof. The light sources may be a single lamp or bulb. Preferably, the light sources are part of a set of light sources that includes a plurality of lamps, bulbs, diodes, or a combination thereof. Each section may include one or more sets of light sources. The light sources may be part of a set of light sources that includes 2 or more, 3 or more, 4 or more, 5 more, 7 or more, 9 or more, or 11 or more light sources that produce light and combine together to form the light extending from the light system. The sets of light sources may include 40 or less, 35 or less, 30 or less, or 25 or less devices that produce light (e.g., each set may include 8 light sources or alternatively all of the sets when combined together may include 8 light sources or 2 light sources). For example, the set of light sources may be the contents of a single printed circuit board that perform a same lighting function and the set of light sources may be a plurality of light sources that are all located on the single printed circuit board.

The set of light sources may be two or more groups of lights that are located on different printed circuit boards. All of the light sources may be located on a single printed circuit board. Sets of light sources may be located on a same printed circuit board. Each section may include one or more sets of light sources or two or more sets of light sources. The printed circuit boards may be located adjacent to one another or spaced apart from one another. For example, the light sources emitting light with the first state may be located on a first printed circuit board and the light sources emitting light with the second state may be located on a second printed circuit board. A single printed circuit board may extend between all of the sections of the light system. The number of light sources in a part (or of a state) of the light may be dependent upon a size of the region or a size illuminated. For example, a daytime running light may have eight or more light sources and a turn signal may have five or more light sources. In another, example, the daytime running light may include two or more groups of light sources that are spaced apart from one another such that when the two or more groups of light sources are on they combine to provide the first light function. A single printed circuit board may extend along all of the segments. The single printed circuit board may extend from a first segment to a third segment. The printed circuit board may extend substantially a length of the light (e.g., extend from a first end of the light to an opposing end of the light (e.g., from a first segment to a third segment)). The light sources emitting light with the first light states and the light sources emitting light with the second light states may be coplanar. The light sources emitting light with the first light states and the light sources emitting light with the second light states may be located on different planes. The light sources emitting light with the first light states and the light sources emitting light with the second light states may be located along an optical axis on the printed circuit board. For example, the light sources emitting light with the first light states and the light sources emitting light with the second light states may be located on a printed circuit board and aligned along an optical axis relative to a reflector. The light sources emitting light with the first light states and the light sources emitting light with the second light states may be staggered relative to the optical axis. For example, one set of light sources emitting light with the light state may be on a first side of the optical axis and a second set of light sources emitting light with the second light state may be located on a second side of the optical axis. The light sources emitting light with the first light states and the light sources emitting light with the second light states may be spaced apart along the printed circuit board such that lengths, heights, or both of the light sources emitting light with the first light states and the light sources emitting light with the second light states vary along the printed circuit boards.

The light source may be one or more lights, two or more lights, or three or more lights. The light source may be static. The light sources may be free of movement. The light source may be fixed. The light sources may be a row of lights, a column of lights, a matrix of lights extending in rows and columns, or a combination thereof. The light sources may be static and may be manually or physically adjusted by adjusting the light or an adjustment mechanism of the light so that the light sources are directed to a desired location. The light sources may be fixed and the light from the light source may be moved, bent, directed, or a combination thereof by optical elements, textured portions, micro-optics, reflectors, light blades, or a combination thereof. Each individual light of the light source may be turned on and off. The light sources may be controlled individually to emit light with the first state and light with the second state. Thus, the light sources emitting light with the first state may be activated or deactivated without the light sources emitting light with the second state being activated or deactivated. The light sources may provide light towards a reflector and then the reflector may redirect (i.e., reflect) the light in a second direction.

The light sources of the light system may produce one light function and a second light source may produce a second light function. Light sources emitting light with the first state of lights (e.g., first light state) may function to create a first light function and light sources emitting light with the second state of lights (e.g., second light state) may create a second light function or different light function. Each light segment may include light sources emitting light with the first light state and light sources emitting light with the second light state. The light sources emitting light with the first light state and the light sources emitting light with the second light state may be lights with different colors, intensities, directions of illumination, or a combination thereof. The first segment, second segment, third segment, fourth segment, fifth segment, or a combination thereof may each include the light sources emitting light with the first light state and the light sources emitting light with the second light state. The light sources emitting light with the first light state and the light sources emitting light with the second light states may produce a different function, a different type of light, or both. The light sources emitting light with the first light state and the light sources emitting light with the second light states may operate at a same time. The light sources emitting light with the first light states and the light sources emitting light with the second light states may not operate at a same time. One light system (e.g., a bi-directional light system) may include a plurality of light sources (e.g., two or more) that produce one light function. The light system may perform only a single light function. The light system, via the light sources, may perform or provide one or more light functions (or light type), two or more light functions, or even three or more light functions. For example, a first light function may be generated by activating the light sources emitting light with the first light states, a second light function may be generated by activating the light sources emitting light with the second light states, and a third light function may be generated by activating the light sources emitting light with the first light states and the second light states. The light system may include or provide one or more light patterns, two or more light patterns, or three or more light patterns with a single light. The light sources may be directed towards reflectors that produce a light function with a light pattern (e.g., a headlight, high beam, low beam, turn signal, DRL, parking indicator, fog light, side marker).

The reflectors may all be located within a housing and function to redirect the light in a predetermined pattern. The reflectors may direct light between an upper housing and a lower housing. The reflectors may be divided into three or more segments. Each of the reflectors may direct light to a predetermined area (e.g., a region external to the vehicle). The reflectors may be divided into two or more groups of reflectors. For example, a first set of reflectors may align with a first set of light sources to generate a first light state and a second set of reflectors may be aligned with a second set of light sources to generate a second light state. The reflectors may direct light differently based upon which of the first light state or the second light state are activated. For example, the light sources emitting light with the first light states and the light sources emitting light with the second light states may be spaced apart on a printed circuit board and the light sources emitting light with the first light state may generate light that is directed to a first region and the light sources emitting light with the second light state may direct light that is directed to a second region that is different than the first region. The reflectors may be divided into a first segment, a second segment, a third segment, a fourth segment, a fifth segment, or a combination thereof. Each segment may include a plurality of reflectors. Each segment may be divided into a first-subset, a second-subset, a third sub-set, a fourth sub-set, or a combination thereof. Some segments may include a single reflector. The reflectors may direct light through a lens. The reflectors may all direct light and the light may combine to form a predetermined pattern. The reflectors may each provide light to a predetermined region to form part of a pattern, part of a function, or both. One reflector may be located adjacent to one light source. The reflectors may be internal reflectors located wholly within the housing of the light. Reflectors and internal reflectors discussed herein may be used substantially interchangeably.

One reflector may be located adjacent to two or more light sources (e.g., a first state and a second state). The reflectors may be a plurality of reflectors. The light system may include two or more, three or more, four or more, six or more, eight or more, ten or more, twelve or more, or even fourteen or more reflectors. The light system may include 50 or less, 40 or less, 30 or less, 20 or less, or 15 or less reflectors. The reflectors may be divided into segments. Each of the segments of the reflectors may generate one or more types of light, two or more types of light, or three or more types of light. Each segment may include one or more reflectors, two or more reflectors, three or more reflectors, or four or more reflectors. Each segment may include ten or less reflectors, eight or less reflectors, or six or less reflectors. The light system may include reflectors that include static reflectors and movable reflectors. The light system may include only static reflectors. A single reflector may be located adjacent to a light sources emitting light with the first state and a light sources emitting light with the second state and if the light sources emitting light with the first state is activated a first light type may be generated and then when the light sources emitting light with the second state is activated a second light type may be generated. The reflectors may be a single reflector with multiple facets. The reflectors may be divided into one or more sub-reflectors, two or more sub-reflectors, or three or more sub-reflectors.

The sub-reflectors may include one or more facets. The sub-reflectors may be aligned with a single light source. A first light source and a first sub-reflector may be aligned. A second light source and a second sub-reflector may be aligned. The first light source and the second light source may be aligned with different sub-reflectors. The sub-reflectors may be located side by side, one above another, diagonally adjacent, or a combination thereof. The sub-reflectors may be parallel to one another and vertically offset. The sub-reflectors may each generate a different light type or a different light state.

The reflectors, sub-reflectors, or both may be divided into different groups that when align with a light source provide a different type of light. For example, some sub-reflectors may create a high beam and some sub-reflectors may create a low beam or a DRL. The sub-reflectors may be grouped together to provide two or more light types such as high beam, low beam, DRL, turn indicator, parking indicator, fog lamp, side marker, or a combination thereof. Depending on a type of light activated, the light sources may be aligned with a different number of reflectors or sub-reflectors. The high beam light source may be aligned relative to five or more, seven or more, nine or more, or even eleven or more sub-reflectors. The high beam light source may be aligned relative to 100 or less, 75 or less, 50 or less or 30 or less sub-reflectors. A turn indicator, parking indicator, DRL, fog lamp, side marker, or a combination thereof may have light sources that are aligned relative to two or more, three or more, four or more, or even five or more sub-reflectors. A turn indicator, parking indicator, DRL, fog lamp, side marker, or a combination thereof may have light sources that are aligned relative to 15 or less, 12 or less, 10 or less or 8 or less sub-reflectors. Some sub-reflectors may be aligned two one or more or two or more light sources such that some sub-reflectors are used to provide two or more different types of lights or lights of different intensity. The light sources emitting light with the first state and the light sources emitting light with the second state may be controlled by one or more controllers.

The controller may control how the lights are illuminated, a light pattern, which lights are illuminated, which state of lights are illuminated, or a combination thereof. The controller may be part of the light system. The controller may be part of the vehicle. The controller may be in communication with a vehicle sensor. The controller may include a vehicle sensor. The controller, the vehicle sensor, or both may determine if the vehicle is on, if the vehicle is in park, if the vehicle is in drive, if the vehicle is in reverse, if a turn signal is activated, if fog lights are activated, if fog lights are needed, if the DRL is needed, if high beams are activated, if low beams are needed, or a combination thereof. The controller may determine when the vehicle is moved out of park or into park. The controller may determine when the vehicle is moved into drive. The controller may monitor a vehicle sensor and the vehicle sensor may provide a signal when a status of the vehicle changes. The controller may deactivate a high beam. The controller may prevent the high beam from being activated when the turn signal is activated. For example, if the user puts on a turn signal and then tries to activate the high beam, the high beam will not turn on. When the turn signal (e.g., a second light type) is activated the high beam (e.g., first light type) may be automatically deactivated. The controller may control two adjacent light systems. For example, if a left turn signal is activated then the high beam of both the left light system and the right light system may be deactivated. The controller may change lights in each of the segments between the first light states and the second light states. The controller may change the lighting based on a sensed condition, a vehicle condition, or both. The light sensor, the vehicle sensor, or both may sense one or more conditions. The controller may change a lighting condition based on an input from a vehicle sensor, a light sensor, or both. The controller may deactivate a high beam when a turn signal is activated. The controller may automatically turn on one or more light types based on a sensed condition. The controller may determine an environment around the vehicle (e.g., environmental lighting conditions). The controller may receive commands from a user and then execute the commands. The controller may include or be in communication with a light sensor.

The light sensor determines an amount of light around the vehicle. The light sensor may monitor environmental lighting conditions. The light sensor monitors the environmental lighting conditions surrounding the vehicle containing the light. The environmental lighting conditions may be a bright light state or a dark light state. For example, the bright light state may be a sunny day and the dark light state may be night, an overcast day, a foggy day, or a combination thereof. The light sensor may monitor an amount of light, an intensity of light, or both. The light sensor may determine if a state of light is a bright light state or a dark light state. The light sensor may be a photodiode, photoresistor, phototransistor, photovoltaic light sensor, or a combination thereof. The light sensor may be part of the vehicle, the light, the controller, or a combination thereof. The controller may be a vehicle controller that is connected to two or more light systems and or more light sensors that provide an input related to environmental lighting conditions.

The controller may control the light to create a first light condition, a second light condition, a third light condition, a fourth light condition, a fifth light condition, a sixth light condition, a seventh light condition, a first dark light condition, a second dark light condition, a third dark light condition, a fourth dark light condition, a fifth dark light condition, a sixth dark light condition, a seventh dark light condition, or a combination thereof. Each of the light conditions, the dark light conditions, or both may form one of the light types. Some of the light conditions and the dark light conditions may form a same light type. For example, a low beam may be activated in both the light conditions and the dark light conditions. The light conditions (e.g., light conditions 1-7 and dark light conditions 1-7) may include combinations of lights and/or light states being activated such that a type of light is generated.

The light conditions may occur when the light sensor indicates that the environment is above a predetermined light threshold. The light controls may turn on the headlights when the environmental light level is about 1500 lux or less, about 1200 lux or less, about 1000 lux or less, or about 750 lux or less. The light controls may turn on the headlights when the environmental light level is about 350 lux or more, about 500 lux or more, or about 700 lux or more. Stated another way the environmental conditions may switch from light conditions to dark conditions or vice versa at a same environmental light level taught herein for turning the headlights on or off. Similarly, the light control may turn off the lights when the light sensors detect an environmental light level of about 750 or more, about 1000 or more, or about 1200 or more. The first light condition may be lighting a DRL, a low beam, or both. The second light condition may be a turn indicator only or a DRL, low beam, turn indicator, or a combination thereof. The third light condition may be a parking indicator, a turn indicator, or both. The third light condition may be a parking indicator and a low beam, a DRL, or both. The fourth light condition may be a low beam only, a DRL only, or both. The fifth light condition may be a high beam only. The sixth light condition may light a side marker and a turn indicator, parking indicator, low beam, high beam, DRL, or a combination thereof. The seventh light condition may light a fog light and a turn indicator, parking indicator, low beam, high beam, DRL, or a combination thereof.

When the predetermined threshold is met or the amount of light is below the predetermined threshold occurs then the light may switch from "light conditions" (e.g., a bright light state) to "dark light conditions" (e.g., a dark light state). The first dark light conditions may illuminate a parking indicator, a turn indicator, or both. The second dark light conditions may illuminate a low beam and a parking indicator, a turn indicator, or both. The third dark light conditions may illuminate two segments or three segments. The third dark light conditions may illuminate two segments to generate a turn indicator and a third segment to generate a low beam. The third dark light conditions may prevent a high beam from being activated. The fourth dark light conditions may illuminate a high beam, a low beam and a turn indicator, a parking indicator, or both. The fifth dark light conditions may deactivate a high beam and may activate three segments. The fifth dark light conditions may deactivate a high beam and activate two segments for the turn indicator and a low beam, a DRL, or both. The sixth dark light conditions may illuminate both a high beam and a low beam. The seventh dark light conditions may illuminate only a low beam or only a DRL. The light may have an eight and night dark light condition. An eight dark light condition may illuminate a side marker and a high beam, low beam, DRL, turn indicator, parking light, or a combination thereof. A ninth dark light condition may illuminate a fog light and a low beam, a high beam, a DRL, a turn indicator, a parking indicator, or a combination thereof.

The one or more light sensors may measure an amount of ambient light in an environment around a vehicle. The light sensor may communicate an amount of light in an environment to the controller. The light sensor may assist controlling the light and the types of light extending from the light through the one or more lenses.

The one or more lenses function to direct the light from the reflectors to a location to be illuminated. The lenses may form a portion of the housing. The housing may include a single lens and the single lens may be both an internal lens and an external lens. The lens may form an outer surface of the light system. Light may extend from the light sources and through the lens to provide light, a light type, or both. The lens may assist in focusing light from each of the two or more segments. The lenses may be located internal to an outer lens. The lenses may function to protect the lights, the reflectors, or both. The lenses may bend light. The lenses may refract light. The lenses may diffuse the light, blend the light, spread the light, direct the light to a predetermined location, create one or more hot spots, create a homogeneous lighting appearance, prevent hot spots, change a color of the light, or a combination thereof. The lens may be one or more lenses, a plurality of lenses, or a single lens. The lens may be located in front of the reflectors. A single lens may cover all of the segments of the light. For example, if there are three segments then one lens extends along all three of the segments. Each segment may be covered by a different lens. The lenses may cover all or a portion of the light system, the light source, light bars, light blade, reflectors, or a combination thereof. Each light system may include a lens. The light system may include a single lens that covers each of the reflectors or light sources that each provide or perform a different function. The lens may cover the reflectors, light source, or both so that light, direct light, reflected light, or a combination thereof extends through the lens. The lens may be one or more lenses. The lenses may be an internal lens that is located behind an outer lens. The lens may be a plurality of lenses. The lens (e.g., primary lens or internal lens) may be a single lens. The one or more lenses may have a shape that directs light to a predetermined location. The one or more lenses may be flat, planar, bio-convex, plano-convex, positive meniscus, negative meniscus, plano-concave, bio-concave, double convex, converging, diverging, or a combination thereof. Each lens may be a single lens. The lens may be free of an internal lens. The lens may be free of an external lens. The lens may be the only lens. The lens may be formed as all or a portion of the upper housing. The lens may be formed with a different shot (e.g., injection molding) than a remainder of the upper housing. The lens may be coated with an outer lens grade material, heat treated, hard coated, made with a material forming an outer lens, or a combination thereof. The lens may have a coating, an anti-glare coating, an anti-mist coating, anti-scratch coating, anti-fog coating, anti-reflective coating, or a combination thereof. The lens may have textures, markings, or both formed on or within the lens. Each lens may be a compound lens (e.g., there may be more than one lens). Each lens has a forward side (or forward surface) and a rearward side (or rearward surface). The lens may include one or more texture portions. The lens may be an interior lens and may cover the light of a light system.

The light may include one or more portions of a housing and a lens. The reflectors and light sources may be located internal of the housing and the lens. The housing functions to connect the light within a vehicle, retain reflectors within a vehicle, hold the reflectors in a predetermined position, support two or more light sources relative to the reflectors, support one or more printed circuit boards relative to the reflectors and/or light sources, or a combination thereof. The housing may be made of or include metal, plastic, a polymer, a polycarbonate, or a combination thereof. The housing may be substantially rigid, have flexible regions, movable regions, or a combination thereof. The housing may receive one or more fasteners or a plurality of fasteners. The housing may include walls such that the housing forms a box. The housing may include a bottom wall, first side wall, second side wall, fore wall, aft wall, or a combination thereof. The housing may be free of a top wall so that the top of the housing is open. The housing may be made up of an upper housing, a lower housing, an outer lens, or a combination thereof. The housing may be a monolithic piece. The upper housing and the lens may be one monolithic piece. The upper housing may be made with a two-shot fabrication method, with the lens being a first shot of a clear material and the remainder of the housing being the second shot of an opaque material. The lens may be a monolithic part of the upper housing, the lower housing, or both. The lens may be formed within a same mold as the upper housing, the lower housing, or both. The housing, reflectors, printed circuit boards, or a combination thereof may include one or more heat sinks. The lower housing may be a heat sink. The housing may include an upper housing, a lower housing, and a lens located between the upper housing and the lower housing.

The upper housing may be made of or include plastic, a polymer, polycarbonate, acrylic, or a combination thereof. The bottom housing may be made of or include metal, aluminum, iron, steel, or a combination thereof. The bottom housing may be a heat sink. The bottom housing may connect to the upper housing so that all of the components of the light may be fixed between the upper housing and the lower housing. The printed circuit board may extend between the upper housing and the lower housing. The bottom housing may remove thermal energy. The bottom housing may remove thermal energy from a printed circuit board, lights, light sources, or a combination thereof. The bottom housing may connect directly to printed circuit boards to remove heat from the printed circuit boards. The bottom housing may extend across one or more segments, two or more segments, three or more segments, or all of the segments of the lights. The heat sinks may remove heat generated by the light sources, controller, light sensor, or a combination thereof.

The upper housing and the lower housing may be connected together. The upper housing and the lower housing may be mechanically connected, chemically connected, or both. The upper housing and the lower housing may be mechanically connected by fasteners such as a bolt and nut, rivet, screw, threaded members, welding, friction welding, ultrasonic welding, clips or a combination thereof. The upper housing may be bonded with an adhesive. One or more gasket type materials may be located between the upper housing and the lower housing. The gasket type material may be rigid, flexible, semi-flexible, elastically deformable, plastically deformable, or a combination thereof. The gasket type material may be made of or include an elastomer, rubber, a polymer, plastic, a thermoset, a silicone, foam, ethylene propylene diene monomer (EPDM), or a combination thereof. The upper housing may include both a mechanical connection and a chemical connection. The connection may be waterproof. The lens of the upper housing may be connected to the heatsink of the lower housing. The lens may not be located within a glue track. The lens may be movable relative to the upper housing so that the lens floats. The upper housing and the lower housing may be finally connected together after the upper housing, the lower housing, or both are cured. The housing including the heat sink may include one or more adjustment devices.

The adjustment devices may rotate about a pivot. The adjustment devices may move a side, an edge, and end, a rear end, both sides, or a combination thereof. The adjustment devices may include one or more threaded members. The adjustment devices when moved may move a portion of a housing so that the lights may be aimed. The adjustment devices may be a pivot such that only one adjustment device is moved and the other adjustment devices are movable to adjust the lights. The adjustment devices may each be individually moved. The adjustment devices may allow for micro adjustments (e.g., 0.001 mm to about 0.1 mm). The adjustment devices may be located in place. The adjustment device may be a motor or be connected to a motor. If the adjustment device is a motor, the motor may be manually adjusted, or automatically adjusted. The motor may adjust the entire light system, a single light within the light system, a reflector, the housing, or a combination thereof.

The present teachings provide a method of changing a light. The method includes determining an amount of light in an environment. The controller may monitor one or more environmental light conditions. The controller may monitor a bright light state, a dark light state, or both. The amount of light may be determined with a light sensor. The method may include monitoring the vehicle, vehicle driving functions, vehicle functions, vehicle modes, or a combination thereof. The monitoring of the vehicle may include monitoring if the vehicle is on, is off, in park, in drive, in reverse, in another driving function, vehicle function, or a combination thereof. The method may monitor modes of the vehicle, for example, if the vehicle is in sport mode, slippery mode, rain mode, snow mode, or a combination thereof. The controller may change the light types based on the monitored driving functions, driving modes, or both. The method monitors if the vehicle is in trailer mode or towing a trailer. The method may change lighting patterns, or lighting types, or both based upon a particular arrangement of a vehicle (e.g., mode, driving function). The method may activate a parking indicator when the vehicle is turned on. The method may include activating a daytime running light (DRL), low beam, high beam, or a combination thereof when the vehicle is put into drive or some other driving function.

The method may select a light type based upon the light sensor, a vehicle input, the mode, or both. The controller may activate a first light type, a second light type, a third light type, a fourth light type, a fifth light type, a sixth light type, a seventh light type, or a combination thereof. The controller may deactivate a first light type, a second light type, a third light type, a fourth light type, a fifth light type, a sixth light type, a seventh light type, or a combination thereof. The controller may activate multiple light types at one time. For example, the controller may activate a parking indicator and a low beam or a parking indicator and a DRL. The controller may prevent a light type from being activated (e.g., a high beam). The controller may deactivate a high beam when a turn indicator is turned on. The controller may prevent the high beam from being activated. The controller may deactivate a first state of the high beam and activate a second state of the high beam so that the high beam generates a portion of a turn signal (e.g. turn indicator). The controller may reactivate a high beam when the turn signal is turned off or deactivated. The controller may change between two or more, three or more, four or more, five or more, six or more, or seven or more light types. The controller may override a user command if the user command is inconsistent with the sensed environment, mode, driving function, or a combination thereof. The controller may control both sides of the vehicle or lights on both sides of the vehicle. For example, if a left turn signal is turned on then both the right and left high beam may be turned off. The controller may link two lights together so that the lights may be controlled in unison. The controller may control a flow of power or the power supply to the lights so that the lights are turned on and off based on the power supply being guided to some of the lights.

FIG. 1 illustrates a side view of a vehicle 2 including a controller 8, a vehicle sensor 9, and light systems 10 (e.g., one on each side). The controller 8 is in communication with the light system 10 (as shown) and the vehicle sensor 9 to determine when the vehicle 2 is turned on and off, when the vehicle 2 is shifted out of park, or both. All or a portion of the light system 10 may be covered by an outer lens 14. The outer lens 14 covers a single housing 12 of the light systems 10 so that all of the different light from different light configurations extend from the single housing 12 through the outer lens 14 to provide a plurality of different lighting features. The single housing 12 may include a headlight 20 (including a high beam and a low beam), a daytime running light 24 (which may include a parking light), a turn signal 26, a side marker 28, or a combination thereof.

Figure 2A:
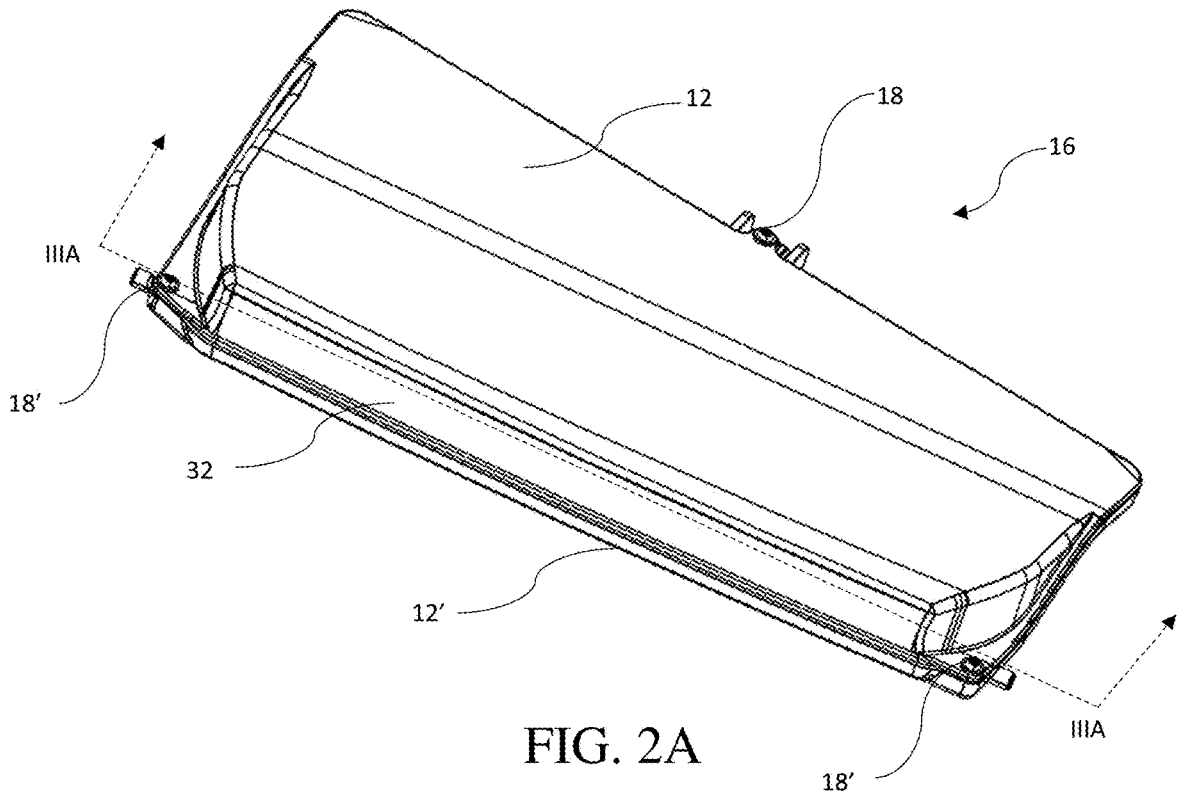
FIG. 2A illustrates a top perspective view of a lighting devices that provides a plurality of different lights and/or light functions.

FIG. 2A illustrates a top perspective view of a light 16 that provides a plurality of different lights and/or light functions. The light 16 includes a first housing 12 and a second housing 12' that are connected together. As shown, the first housing 12 and a lens 32 are formed as a two-shot injection molded piece that form a single monolithic housing. The first housing 12 and the lens 32 may be made of different materials with different optical characteristics. The lens 32 is located at an interface between the first housing 12 and the second housing 12'. The second housing 12' may further function as a heatsink for the light 16. The light 16 is adjustable by moving the light 16 with adjustment devices 18 and 18' to aim the light 16 in a predetermined direction or at a desired location.

Figure 2B:
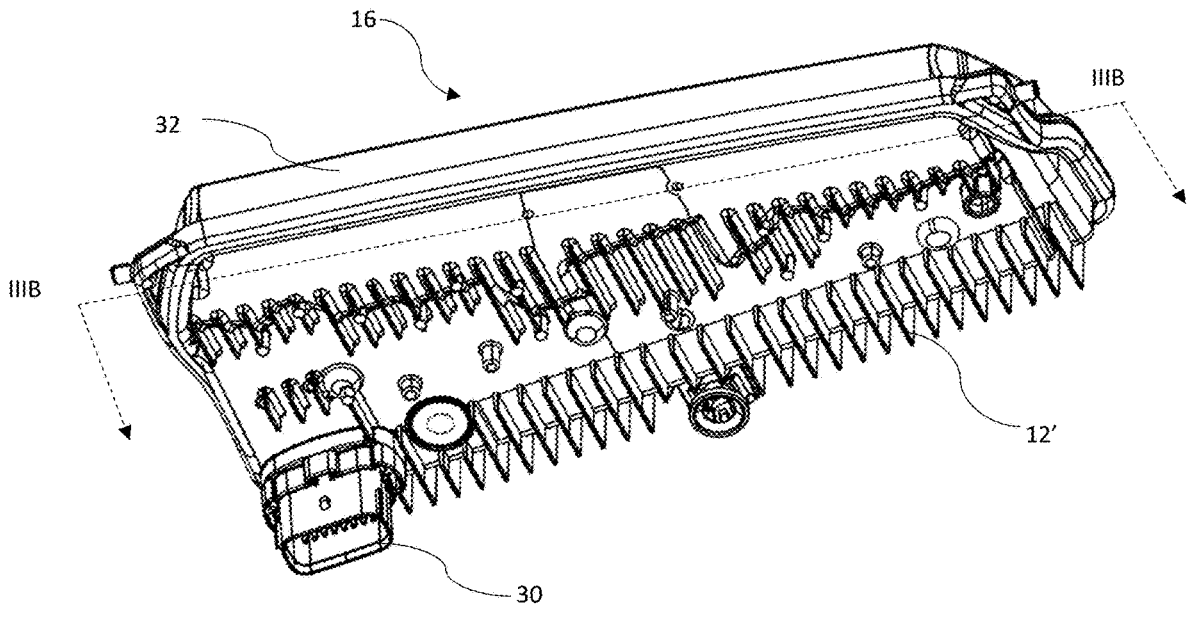
FIG. 2B illustrates a bottom perspective view of the lighting devices of FIG. 2A.

FIG. 2B illustrates a bottom perspective view of the light 16 of FIG. 2A. The second housing 12' is a heat sink that includes a wire harness connector 30 that when connected to a power source (not shown) that supplied power to the light 16 so that the light may be illuminated. The wire harness connector 30 permits the light 16 to communicate with the vehicle and other components on the vehicle. A forward end of the second housing 12' terminates at the lens 32.

Figures 3A, 3B:
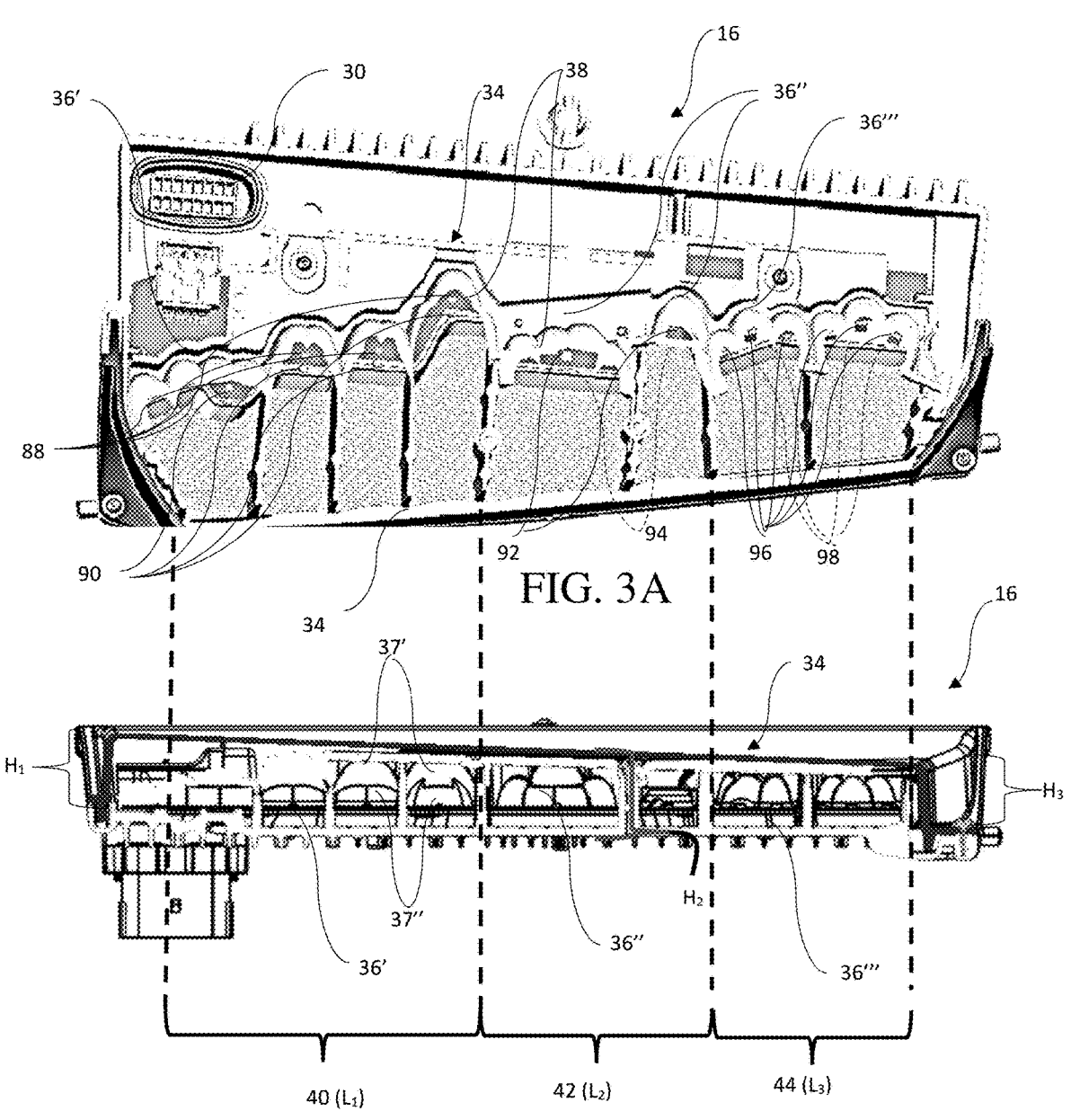
FIG. 3A is a top cross-sectional view of the lighting devices along lines IIIA-IIIA of FIG. 2A.
FIG. 3B is a front cross-sectional view of the lighting devices along lines IIIB-IIIB of FIG. 2B.

FIG. 3A is a top cross-sectional view of the light 16 along lines IIIA-IIIA of FIG. 2A. so that the reflector 34 is exposed. The reflector 34 is located proximate to the wire harness connector 30 that supplies power to illuminate the light 16 and/or control signals into the light 16. The reflector 34 includes a plurality of internal reflectors 36', 36", and 36''' that direct light out of the light 16 through the lens 32. The plurality of internal reflectors 36', 36", and 36''' may redirect light individually or more than one of the plurality of internal reflectors 36', 36", and 36''' may redirect light to generate a predetermined light condition. The reflector 34 is divided into a first segment 40 including first internal reflectors 36', a second segment 42 including second internal reflectors 36", and a third segment 44 including third internal reflectors 36'''. Each of the segments 40, 42, and 44 have two sets of lights to create two light states. The first segment 40 includes a first light 88 that provides a first state and a first light 90 that provides a second state. The first light 88 that provides a first state and the first light 90 that provides the second state are both located on a single printed circuit board 38. The second segment 42 includes a second light 92 that provides a first state and a second light 94 that provides a second state. The second light 92 that provides a first state and the second light 94 that provides a second state are located on a same printed circuit board 38. The third segment 44 includes a third light 96 that provides a first state and a third light that 98 provides a second state. The third light 96 that provides a first state and the third light 98 that provides a second state are located on a same printed circuit board 38.

FIG. 3B is a front cross-sectional view of the light 16 along lines IIIB-IIIB of FIG. 2B. FIG. 3B is alighted with the light 16 of FIG. 3A to demonstrate the first segment 40, the second segment 42, and the third segment 44. The first segment 40 has a length ($L_1$), the second segment 42 has a length ($L_2$), and the third segment 44 has a length ($L_3$). The first segment 40 has a height ($H_1$), the second segment 42 has a height ($H_2$), and the third segment 44 has a height ($H_3$). As shown, the reflector 34 includes the first internal reflectors 36' that are located in the first segment 40, the second internal reflectors 36" that are located in the second segment 42, and the third internal reflectors 36''' that are located in the third segment 44. Each of the internal reflectors 36', 36", and 36''' may be divided into first sub-reflectors 37' and second sub-reflectors 37".

Figure 4A:
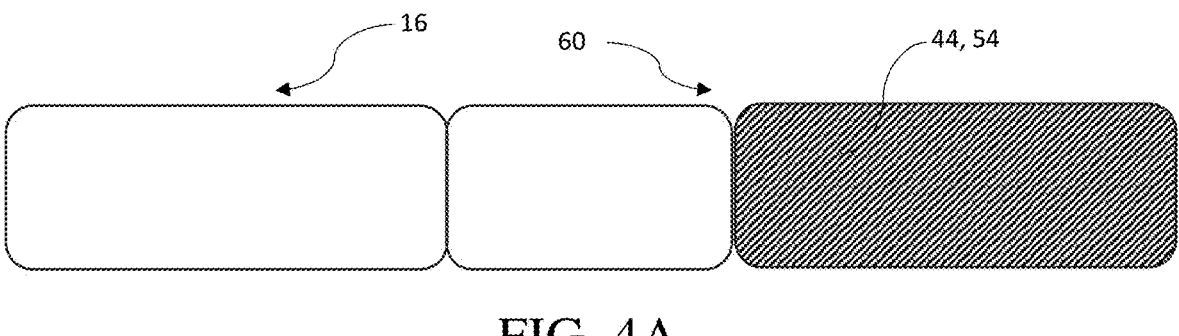
FIG. 4A is a front view of the lighting device emitting light to satisfy a first light configuration for a bright environment.

FIG. 4A is a front view of the light 16 in an environment that has a bright light state. Third lights 54 are powered at a first state to illuminate a third segment 44 of the light 16 to provide a first light condition 60 (e.g., a first light type). The first light condition 60 may provide light during the daytime or when light states around the vehicle are above a predetermined threshold. For example, if the vehicle is operating in a lit parking garage the vehicle may determine that the environment is the bright light state and operate in a same manner as if the vehicle was in day light. The first light condition 60 may be operating a daytime running light (DRL). The first light condition 60 may be operating the third light 54 at a first state or low power so that an intensity of the light is lower than an intensity of a headlight.

Figure 4B:
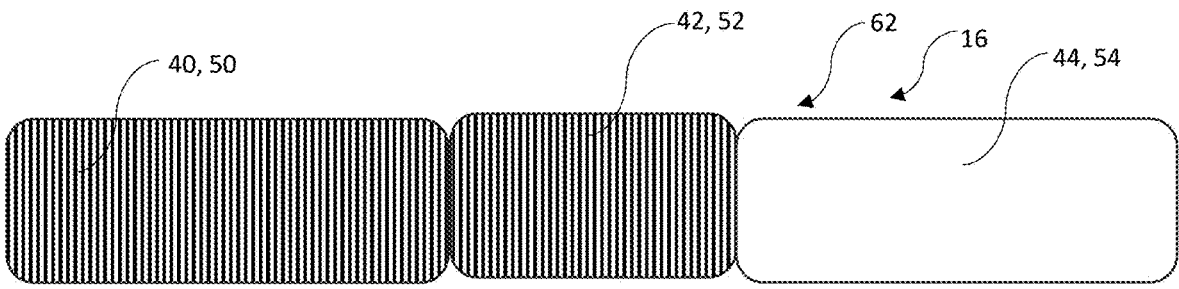
FIG. 4B is a front view of the lighting device emitting light to satisfy a second light configuration for the bright environment.

FIG. 4B is a front view of the light 16 in an environment that is a bright light state. First lights 50 and second light 52 are illuminated while illuminating a first segment 40 and a second segment 42 respectively of the light 16 to provide a second light condition 62 that appears as a single light. The first light 50 illuminates a first light (not shown) at a first state to provide the second light condition 62. The first light 50 at the first state matches the second light 52 so that the first light 50 and second light 52 appear to be one continuous light. The second light condition 62 is a turn signal. In the second light condition 62 the third lights 54 in the third segment 44 are off.

Figure 4C:
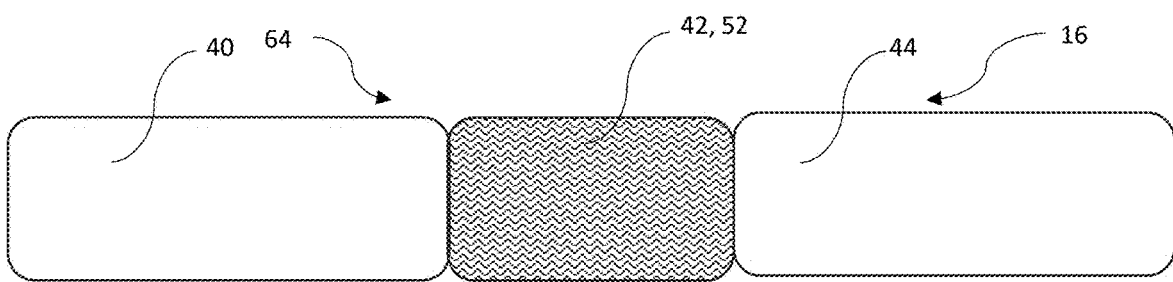
FIG. 4C is a front view of the lighting device in the bright environment providing a third light configuration.

FIG. 4C is a front view of the light 16 in an environment that is a bright light state. The second light 52 is illuminated to illuminate the second segment 42 of the light to provide a third light condition 64. As shown, the third light condition 64 is a parking indicator or a daytime running light with a smaller area than the daytime running light of FIG. 4A. The third light condition 64 may only be on when the vehicle is in park. However, the third light condition 64 may be on while the vehicle is in motion. The second light 52 may be illuminated at a same state (e.g., intensity of light or output of light) when the second light 52 is used as a parking indicator or a turn indicator (see FIG. 4B). However, the turn indicator of FIG. 4B may have a first state that is higher than a second state of the parking indicator (FIG. 4C). The third light condition 64 may have an increase of intensity or change in color so that the third light condition 64 is a daytime running light. As shown, the first segment 40 and the second segment 44 are off so that only the second segment 42 are illuminated.

Figure 4D:
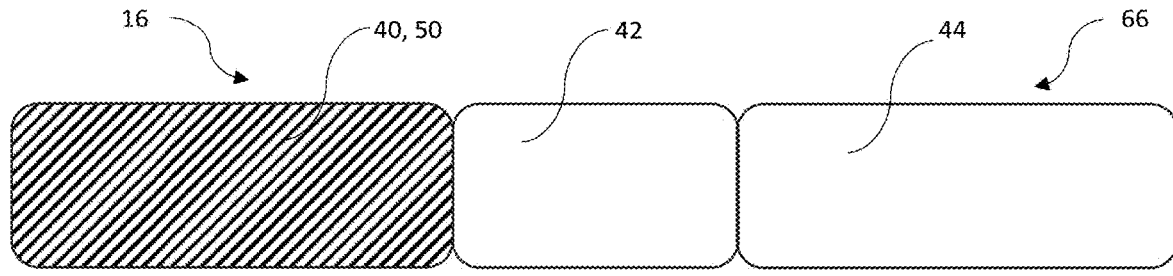
FIG. 4D is a front view of the lighting device in the bright environment providing a fourth light configuration.

FIG. 4D is a front view of the light 16 in an environment that is a bright light state. The first segment 40 is powered at a second state to illuminate so that the first segment 40 provides a fourth light condition 66. The fourth light condition 66 may be a daytime running light that provides less light than when the first lights 50 are powered at a state where the light generated by the first segment is a high beam.

The fourth light condition 66 (e.g., DRL) has more light than the second light condition 62 (e.g., turn indicator) and less light than when the first segment 40 is powered as a high beam. The fourth light condition 66 may be manually enabled or automatically enabled. The second segment 42 and the third segment 44 are off in the fourth light condition 66.

Figure 4E:
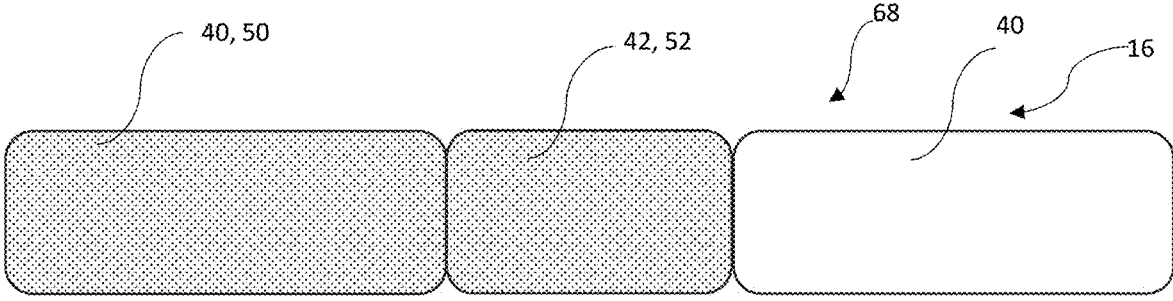
FIG. 4E is a front view of the lighting device in the bright environment providing a fifth light condition.

FIG. 4E is a front view of the light 16 in an environment that is a bright light state. The first segment 40 includes first lights 50 that are on and the second segment 42 includes second lights 52 that are on to create a fifth light condition 68. The first segment 40 and second segment 42 are illuminated at a level brighter than FIG. 4B and a different color than FIG. 4B so that a different type of light is created. The fifth light condition 68 provides more light than the first light condition 60 and a same type of light (e.g., DRL). The fifth light condition 68 may include an amount of light that is about 1.5 or more, 2.0 or more, or 2.5 or more to that of the first light condition 60. The third segment 44 is off in the fifth light condition 68.

Figure 4F:
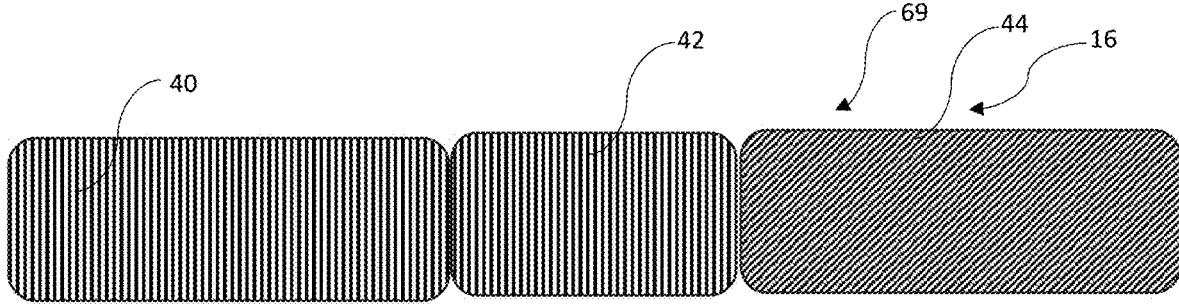
FIG. 4F is a front view of the lighting device in the bright environment providing sixth light condition.

FIG. 4F is a front view of the light 16 in an environment that is a bright light state. The first segment 40 and the second segment 42 are illuminated with a same intensity and color light and the third segment 44 is illuminated at a different color, intensity, or both as the first segment 40 and the second segment 42 to create a sixth light condition 69. The first segment 40 and the second segment 42 combine to provide a turn indicator. The third segment 44 provides light as a DRL. The third segment 44 may be illuminated to a same level as shown in FIG. 4A. The first segment 40 and the second segment 42 are illuminated to the same level as FIG. 4B.

Figures 5A, 5B, 5C, 5D, 5E:
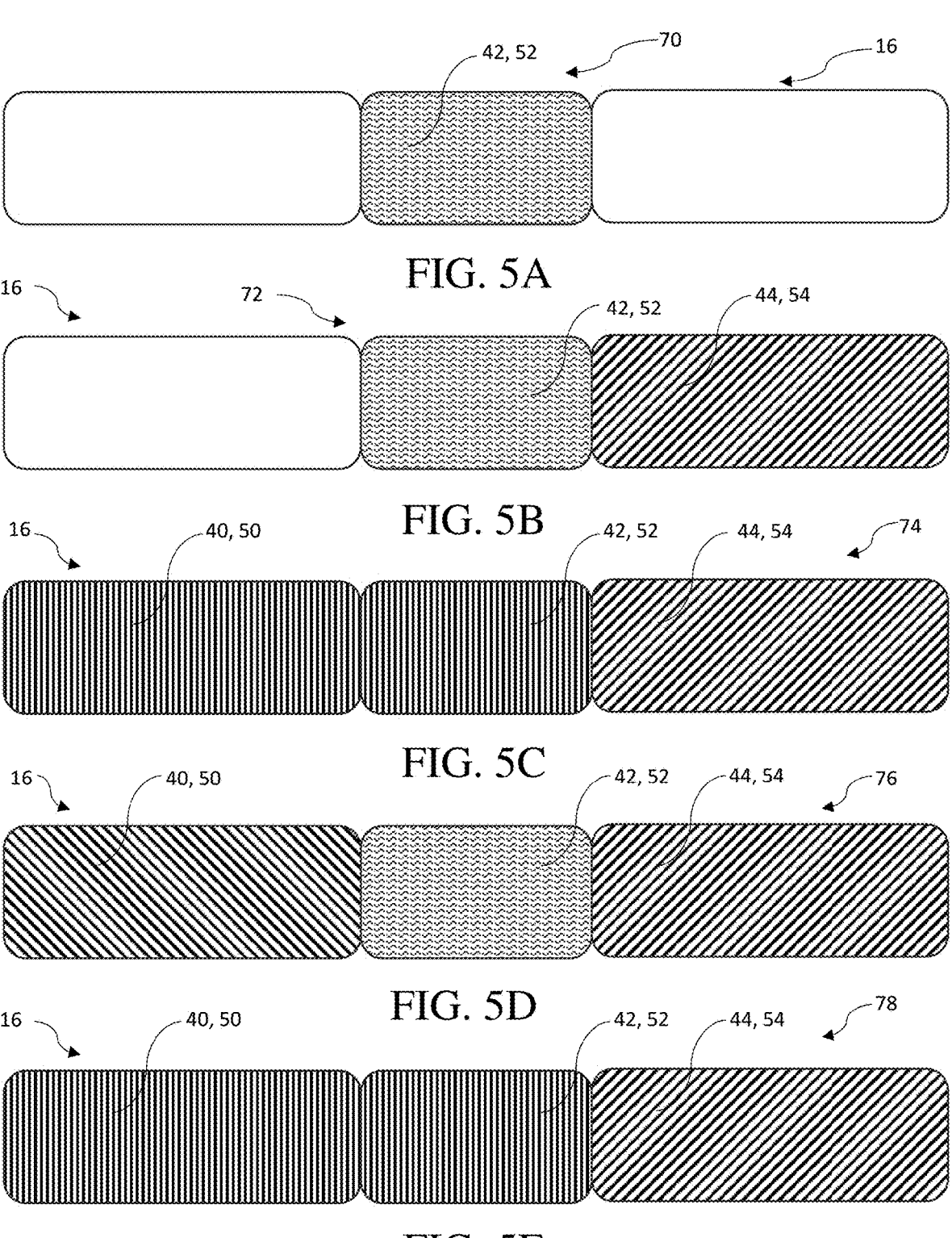
FIG. 5A is a front view of the lighting device in a dark environment providing a first dark lighting configuration.
FIG. 5B is a front view of the lighting device in the dark environment providing a second dark lighting configuration.
FIG. 5C is a front view of the lighting device in the dark environment providing a third dark lighting configuration.
FIG. 5D is a front view of the lighting device in the dark environment providing a fourth dark lighting configuration.
FIG. 5E is a front view of the lighting device in the dark environment providing the third dark lighting configuration being switched from the fourth dark lighting configuration of FIG. 5D.

FIG. 5A is a front view of the light 16 in an environment that is dark or has a dark light state and the vehicle is not in motion (e.g., in park). However, the light 16 may operate while the vehicle is not in motion to provide the first dark light condition 70. The second light 52 is powered at a first state to illuminate a second segment 42 of the light 16 to provide a first dark light condition 70. The first dark light condition 70 may be a parking indicator similar to that of FIG. 4C. The second light 52 may be operated at the first state or the second state to provide the first dark light condition 70. The first dark light condition 70 may be the same as the third light condition 64 of FIG. 4C and may operate in a same manner.

FIG. 5B is a front view of the light 16 in an environment that is dark. The third light 54 powered to illuminate third segment 44 and the second light 52 powered at the second state to illuminate a second segment 42 of the light 16 to provide a second dark light condition 72 (e.g., the same as the fourth light condition of FIG. 4D). The second dark light condition 72 also includes the first dark light condition 70 of FIG. 5A. The second dark light condition 72 is a low beam headlight and the first dark light condition 70 is a parking indicator. When the vehicle is moved from park (FIG. 5A) into drive, the second dark light condition 72 may automatically be activated such that the parking indicator is not the only light activated.

FIG. 5C is a front view of the light 16 in an environment that has a dark light state. The first light 50 illuminates the first segment 40 at a first state. The second light 52 illuminates the second segment 42 at a second state that is different than the first state of FIGS. 5A-5B. The first segment 40 and the second segment 42 are illuminated at a same state so that the first segment 40 and the second segment 42 appear as a single light that provides a turn indicator. The third segment 44 is illuminated by a third light 54 to provide a low beam. The light 16 is configured in the third dark light condition 74.

FIG. 5D is a front view of the light 16 in an environment that has a dark light state. The first light 50 is powered to illuminate the first segment 40 at a second state. The second light 52 is powered at the first state to illuminate the second segment 42 and the third light 54 is powered at first state to illuminate the third segment 44 at the second state. As shown, the first segment 40 provides a high beam (e.g., brights or high headlights), the second segment 42 provides the parking indicator lights, and the third segment 44 provides the low beam.

FIG. 5E is a front view of the light 16 in an environment that is dark. The first light 50 illuminates the first segment 40 at a first state. The second light 52 illuminates the second segment 42 at a second state that is different than the first state of FIGS. 5A-5B. The first segment 40 and the second segment 42 are illuminated at a same state so that the first segment 40 and the second segment 42 appear as a single light that provides a turn indicator. The third segment 44 is illuminated by a third light 54 to provide a low beam. The light 16 is configured in the fifth dark light condition 78, where the first light 50 is prevented from illuminating the first segment 40 at a second state and is only able to illuminate the first segment 40 at the first state. The first segment 40 and the second segment 42 are combined to create a turn signal or turn indicator such that the third dark light conditions 74 and the fifth dark light conditions 78 are the same light output.

Figure 5F:
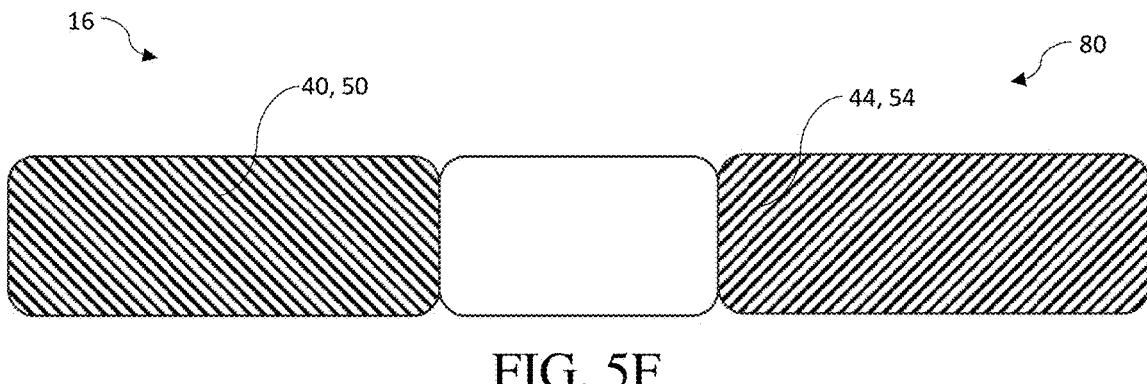
FIG. 5F is a front view of the lighting device in the dark environment providing a fifth dark lighting configuration.

FIG. 5F is a front view of the light in an environment that has a dark light state. The first light 50 is powered to illuminate a first segment 40 to provide high beam. The third light 54 is powered to illuminate the third segment 44 to provide a low beam. The high beam and the low beam create the sixth dark light condition 80.

Figure 6:
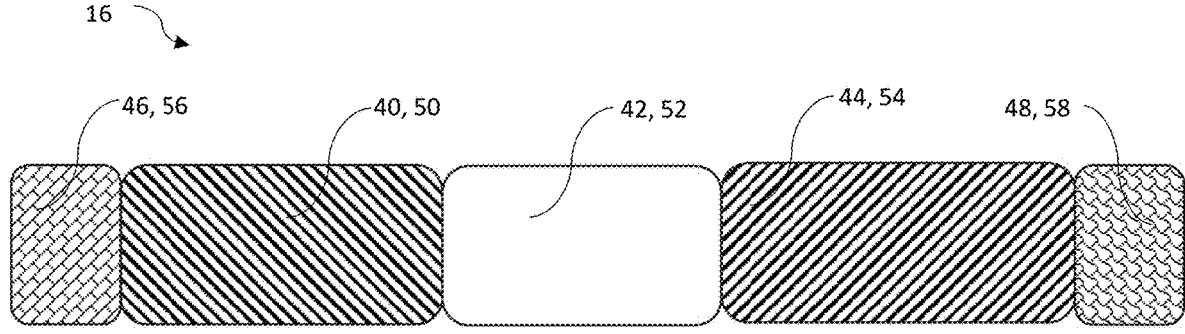
FIG. 6 is a front view of a lighting device with five segments.

FIG. 6 is a front view of a light 16 with five segments. The light includes first lights 50 within first segments 40, second lights 52 with second segments 42, third lights 54 within third segments 44, fourth lights 56 within fourth segments 46, and fifth lights 58 within fifth segment 48. The fourth segments 46 and the fifth segments 48 may be discrete light segments. The fourth segments 46 may be lightened with the first segment 40 to create one elongated light. The fifth segments 48 may be lightened with the third segments 44 to create one elongated light. The fourth segment 46 is a side marker light. The fifth segment 48 is a fog light.

Figure 7A:
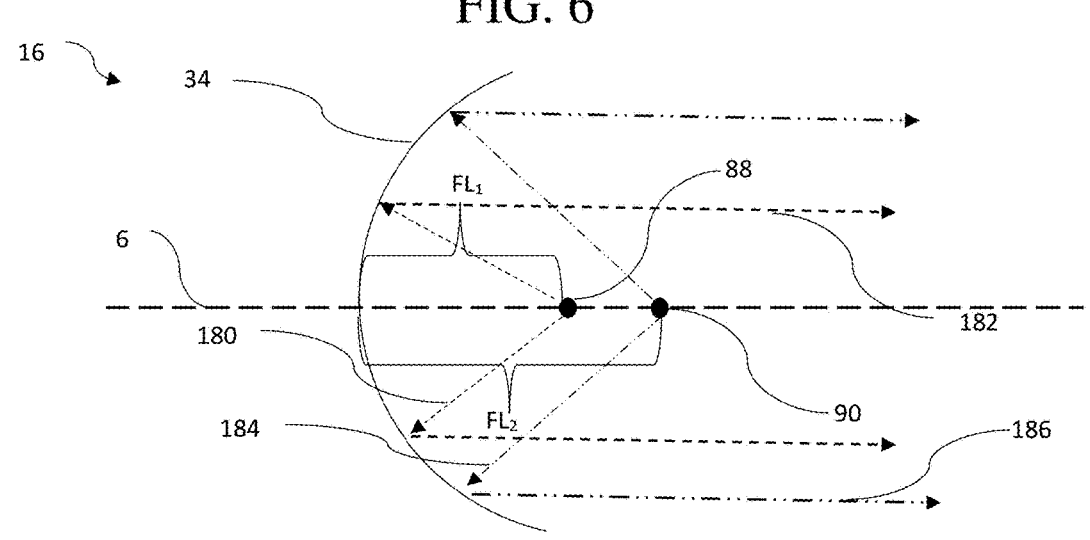
FIG. 7A is a cross-sectional view of a reflector with light sources.

FIG. 7A illustrates a cross-sectional view of a light 16. The light 16 has a reflector 34, a first light with a first state 88 and a first light with a second state 90. The first light with the first state 88 is located a distance (e.g., focal length) $(FL_1)$ from the reflector 34. The first light with the first state 88 provides first direct light 180 to the reflector 34 and then the reflector 34 reflects the light as a first reflected light 182. The first reflected light 182 provides a first light condition. The first light with the second state 90 is located a distance (e.g., focal length) $(FL_2)$ from the reflector 34. The first light with the second state 90 provides a second direct light 184 to the reflector 34 and then the reflector 34 reflects the light as a second reflected light 186. The second reflected light 186 provides a second light condition that is different from the first light condition. As shown, the first light with a first state 88 and the first light with a second state 90 are aligned on the optical axis 6. However, the first light with the first state 88 and the first light with the second state 90 may be offset relative to one another, the optical axis 6, or both.

Figure 7B:
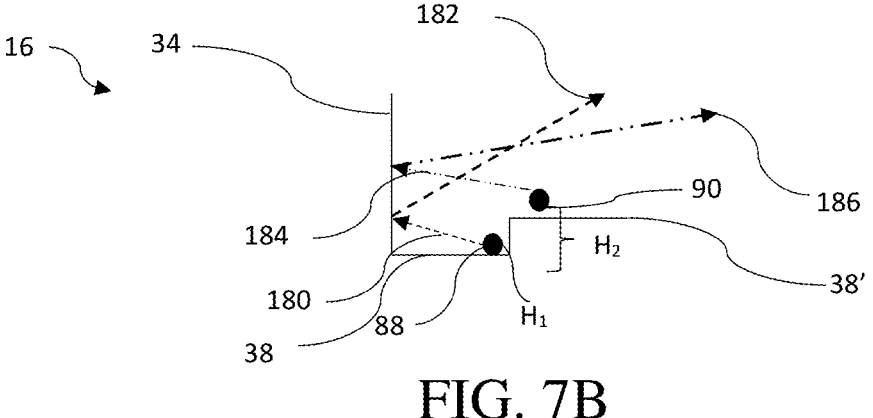
FIG. 7B is a side view of a reflector with light sources.

FIG. 7B illustrates a side view of the light 16. The light 16 includes a reflector 34 with a first light with a first state 88 and a second light with a second state 90. The first light with the first state 88 is located on a first printed circuit board 38 at a first height ($H_1$) and directs a first direct light 180 into contact with the reflector 34, which redirects the light as a first reflected light 182. The first light with the second state 90 is located on a second printed circuit board 38' at a second height ($H_2$) and directs a second directed light 184 into contact with the reflector 34, which redirects the light as a second reflected light 186.

Figure 8:
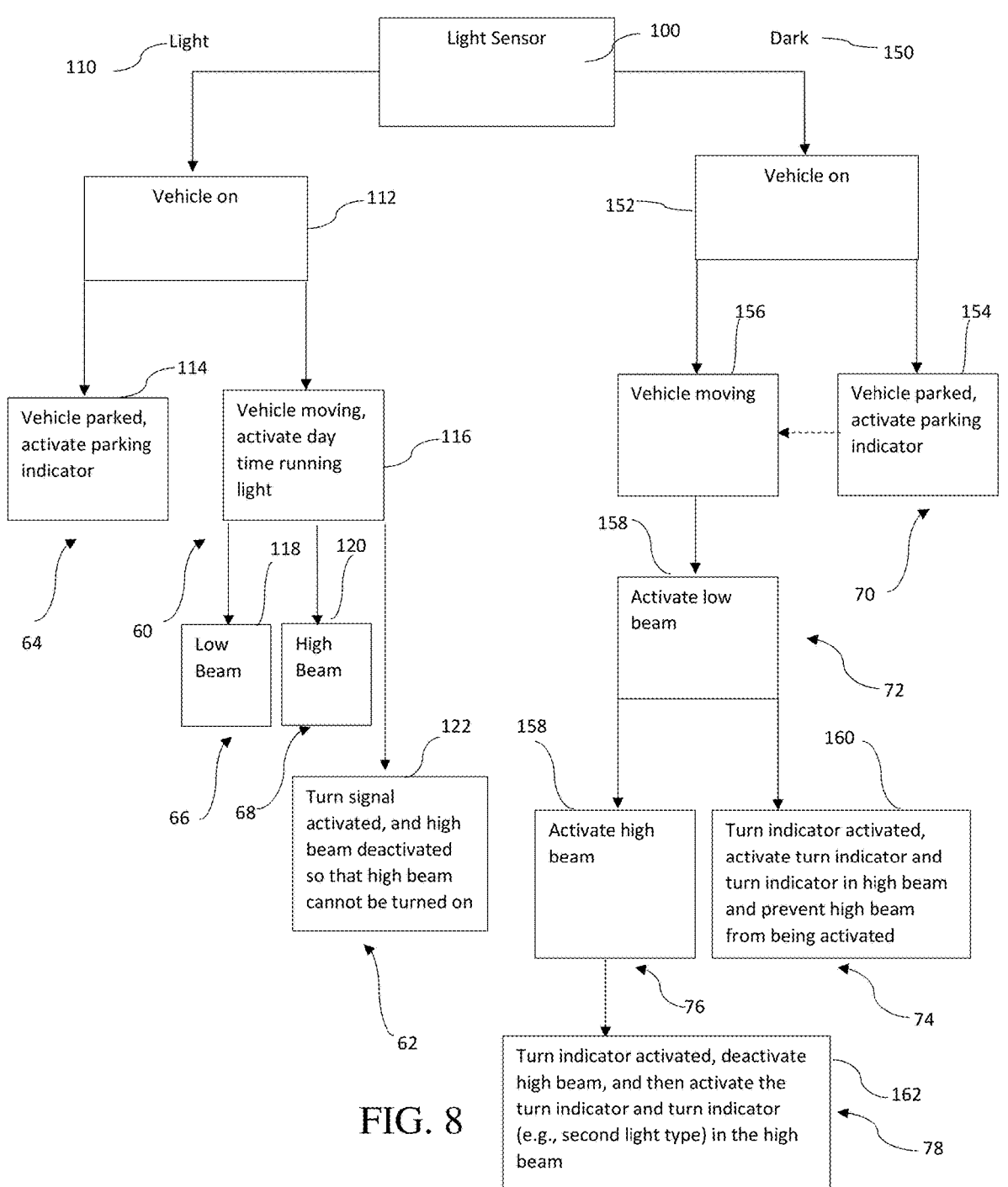
FIG. 8 is a schematic regarding control of the lighting device.

FIG. 8 is a schematic regarding control of the lights of the vehicle 2 of FIG. 1. The controller 8 (shown in FIG. 1) is in communication with a light sensor 100 and a vehicle sensor 9 so that the controller 8 controls the lights to create the conditions discussed in FIGS. 4A-6. The light sensor 100 determines if the environment has a bright light state 110 or a dark light state 150. If the light sensor 100 determines that the environment has the bright light state 110 then the controller 8 determines if the vehicle is on 112 based on a signal from the vehicle sensor 9. If the vehicle is on 112 then the controller 8 determines if the vehicle is parked 114 or moving 116.

If the vehicle is parked 114 and the vehicle is on 112, but the light sensor determines that the environment is light 110 then the controller 8 (see FIG. 1) may not activate the parking indicator, but a user may manually activate the parking indicator to create the third light condition 64 where a second light (e.g., a parking indicator) is activated to alert others that the vehicle may move soon. Once the vehicle is moved into drive or begins moving 116 then the controller 8 will activate the daytime running light (DRL) to create the first light condition 60.

The user may activate 118 the low beam to create the fourth light condition 66 if the user desired more light than the DRL. The user may activate 120 the high beam to create the fifth light condition. While driving, the user may activate 122 the turn signal to create the second light condition 62. While the second light condition 62 is activated the high beam may be deactivated so that both the high beam and the turn indicator are activated to generate (e.g., complete the second light condition) the turn signal.

If the light sensor 100 detects that the environment has a dark light state 150 then the controller 8 will determine if the vehicle is on 152. If the vehicle is on but the vehicle is in park then the controller will activate 154 the parking indicator in the first dark light condition 70. If the vehicle is shifted into drive or is moving 156 then the vehicle sensor 9 will provide a signal to the controller 8 so that the controller 8 will activate the low beam 158 in addition to the parking indicator 154 remaining on to create the second dark light condition 72. The user may activate the high beam to create the fourth dark light condition 76. The user during operation may activate 160 a turn signal when the high beam is not active so that the third dark light condition 74 is created. If the lights are in the fourth dark light condition 76 when the turn indicator is activated 162, the high beam is deactivated creating the fifth dark light condition 78 so that both the turn indicator area and the high beam area are illuminated to form the turn signal light.

Figure 9:
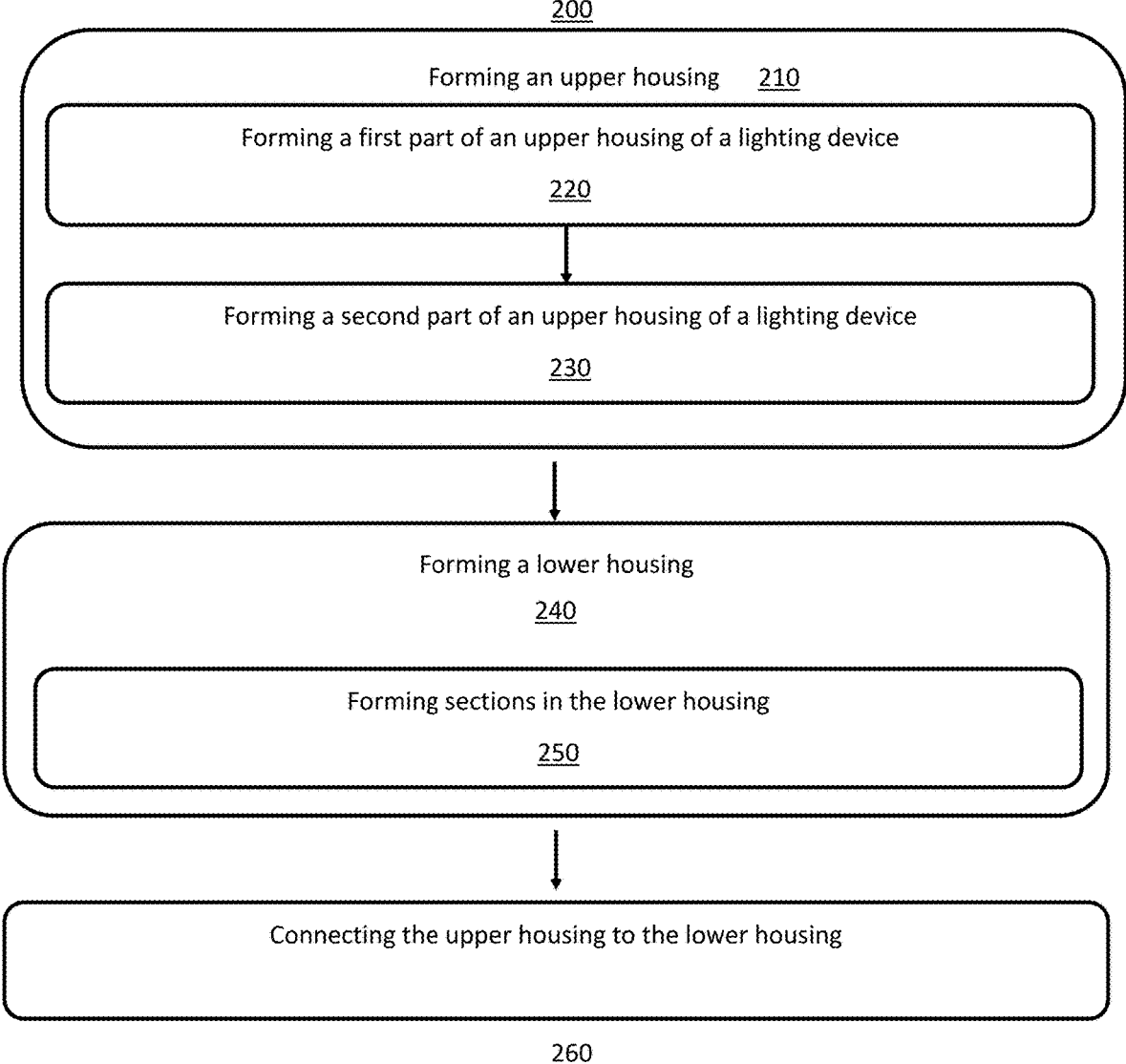
FIG. 9 is a schematic view of a method of manufacturing a lighting device.

FIG. 9 is a method of producing a lighting device 200. The method includes forming an upper housing 210. The upper housing is formed 210 by forming a first part of the upper housing 220 and then forming a second part of the upper housing 230. The first part may be formed by a first shot of a first material 220 and the second part may be formed by a second shot of a second material 230. The second shot may form a lens that forms an integral part of the first part. A lower housing may be formed 240. A plurality of sections may be formed within the lower housing 250. The upper housing and the lower housing are connected together 260 to form the lighting device 200.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements, ingredients, components or steps that do not materially affect the basic and novel characteristics of the combination. The use of the terms "comprising" or "including" to describe combinations of elements, ingredients, components or steps herein also contemplates embodiments that consist essentially of or even consists of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

ELEMENT LIST

2 Vehicle
4 Axis of the Vehicle
6 Optical Axis
8 Controller
9 Vehicle Sensor
10 Light System
12, 12' Housing
14 Outer Lens
16 Light
18, 18' Adjustment Device
20 Headlight
22 Fog Light
24 Daytime Running Light (DRL)
26 Turn Signal
28 Side Marker
30 Wire Harness Connector
32 Lens
34 Reflector
36 Internal Reflectors
38, 38' Printed Circuit Board
40 First Segment
42 Second Segment
44 Third Segment.
46 Fourth Segment
48 Fifth Segment
50 First Lights
52 Second Lights
54 Third Lights
56 Fourth Light
58 Fifth Light
60 First Light Condition
62 Second Light Condition
64 Third Light Condition
66 Fourth Light Condition
68 Fifth Light Condition
70 First Dark Light Condition
72 Second Dark Light Condition
74 Third Dark Light Condition
76 Fourth Dark Light Condition
78 Fifth Dark Light Condition
80 Sixth Dark Light Condition
88 First Light-First State
90 First Light-Second State
92 Second Light-First State
94 Second Light-Second State
96 Third Light-First State
98 Third Light-Second State
100 Light Sensor
110 Bright Light State
112 Vehicle On
114 Parked
116 Moving
118 Low Beam Only
120 High Beam Only
122 Turn Signal
150 Dark Light state
152 Vehicle On.
154 Parked
156 Moving
158 Moving
160 High Beam Activated
162 Turn Off High Beam
180 First Direct Light
182 First Reflected Light
184 Second Direct Light 24
186 Second Reflected Light
200 Forming a Lighting Device
210 Forming an Upper Housing
220 Forming a First Part of the Upper Housing
230 Forming a Second Part of the Upper Housing
240 Forming a Lower Housing
250 Forming Sections in the Lower Housing
260 Connecting the Upper Housing to the Lower Housing

We claim:
1. A light comprising:
a housing comprising:
a first segment comprising:
first lights of a first light type to generate a first state and
first lights of a second light type to generate a second state;
a second segment comprising:
second lights of a third light type to generate a first state and
second lights of a fourth light type to generate a second state;
a third segment comprising:
third lights of a fifth light type to generate a first state and
third lights of a sixth light type to generate a second state; and
wherein the light is in communication with a controller that is configured to:
activate the first lights of the first light type to create a first light condition;
activate the first lights of the second light type to create a portion of a second light condition;
activate the second lights of the third light type to complete the second light condition; and
deactivate the first lights of the first light type automatically when the first lights of the second light type, the second lights of the third light type, or both are activated.

2. The light of claim 1, wherein the first light condition is a high beam of a vehicle and the second light condition is a turn signal of the vehicle.

3. The light of claim 1, further comprising:
one or more light sensors configured to determine environmental lighting conditions surrounding a vehicle housing the light.

4. The light of claim 3, wherein the one or more light sensors are located adjacent to the light and the one or more light sensors are in communication with the controller.

5. The light of claim 3, wherein the environmental lighting conditions are a bright light state or a dark light state.

6. The light of claim 5, wherein the controller is configured to activate the third lights of the fifth light type in the third segment to create a third light condition, which is a daytime running light (DRL) when the one or more light sensors sense the bright light state as the environmental light condition and the controller is configured to activate the third lights of the sixth light type in the third segment to create a fourth light condition, which is a low beam when the one or more light sensors sense the dark as the environmental light condition.

7. The light of claim 5, wherein the controller is in communication with vehicle driving functions or modes to determine a status of the vehicle, and wherein the vehicle driving functions or the modes include the vehicle is on, the vehicle is off, the vehicle is in park, and the vehicle is in drive.

8. The light of claim 1, wherein the controller is in communication with the light and an adjacent light so that the controller changes to the light and changes to the adjacent light or vice versa.

9. A light comprising:

a single housing comprising:

a first segment comprising:

first lights of a first light type to generate a first state and first lights of a second light type to generate a second state;

a second segment comprising:

second lights of a third light type to generate a first state and second lights of a fourth light type to generate a second state;

a third segment comprising:

third lights of a fifth light type to generate a first state and third lights of a sixth light type to generate a second state;

one or more vehicle sensors configured to monitor a vehicle function of the vehicle or a mode of the vehicle; and wherein the light, the vehicle, and the one or more vehicle sensors, are in communication with a controller that is configured to:

determine when the vehicle function changes to an on state;

determine when the vehicle function is out of a park position;

activate the first lights of the first light type to create a first light condition;

activate the first lights of the second light type to create a portion of a second light condition;

activate the second lights of the third light type to complete the second light condition; and deactivate the first lights of the first light type automatically when the first lights with the second light type, the second lights with the third light type, or both are activated.

10. The light of claim 9, wherein the one or more vehicle sensors are part of the controller.

11. The light of claim 9, wherein the controller automatically activates the third lights with the fifth light type when the vehicle functions changes from the park position to a drive position to create a third light condition.

12. The light of claim 9, wherein the controller automatically activates the second lights with the fourth light type when the vehicle function changes from an off state to the on state creating a fourth light condition.

13. The light of claim 9, wherein the controller is configured to communicate with the light on a first side of the vehicle and an adjacent light on a second side of the vehicle and the controller is configured to deactivate a high beam of the adjacent light and the light when a turn indicator of the light or the adjacent light is activated.

14. A method comprising:

controlling lights of a vehicle comprising:

activating first lights of a first light type in a first segment so that the first light type is configured to generate a first state of the first segment;

activating first lights of a second light type in the first segment so that the second light type is configured to generate a second state of the first segment;

activating second lights of a third light type in a second segment so that the third light type is configured to generate a first state of the second segment;

controlling second lights of a fourth light type in the second segment so that the fourth light type is configured to generate a second state of the second segment;

controlling third lights of a fifth light type in a third segment to generate a first state of the third segment; and deactivating the first lights of the first light type when the first lights with the second light type are activated;

wherein the first lights of the first light type in the first segment and the second light with the of the third light type in the second segment combine to form a single light.

15. The method of claim 14, further comprising:

monitoring environmental light conditions surrounding the vehicle containing the lights.

16. The method of claim 15, wherein the environmental light conditions include a dark light state or a bright light state.

17. The method of claim 15, wherein the first lights of the first light type in the first segment are reactivated or reactivable when the first lights of the second light type are deactivated.

18. The method of claim 14, further comprising:

activating the second lights of the second light type in the second segment to create a third light type.

19. The method of claim 14, further comprising:

monitoring vehicle driving functions or modes and controlling the lights based on the driving functions, the modes, or both.

20. The method of claim 14, wherein the lights of the vehicle comprise a driver side light and a passenger side light and a controller of the vehicle controls the driver side light based on changes to the passenger side light and vice versa.

* * * * *